United States Patent
Song et al.

(10) Patent No.: US 10,652,374 B2
(45) Date of Patent: May 12, 2020

(54) MOBILE TERMINAL HAVING CASE, METHOD FOR MANUFACTURING SAME

(71) Applicant: LG ELECTRONICS INC., Seoul (KR)

(72) Inventors: Insu Song, Seoul (KR); Sukho Hong, Seoul (KR); Dongjin Kim, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

(21) Appl. No.: 16/062,299

(22) PCT Filed: Sep. 28, 2016

(86) PCT No.: PCT/KR2016/010840
§ 371 (c)(1),
(2) Date: Jun. 14, 2018

(87) PCT Pub. No.: WO2017/104950
PCT Pub. Date: Jun. 22, 2017

(65) Prior Publication Data
US 2018/0375973 A1 Dec. 27, 2018

(30) Foreign Application Priority Data
Dec. 17, 2015 (KR) .......... 10-2015-0181239
Sep. 20, 2016 (KR) .......... 10-2016-0120017

(51) Int. Cl.
*H01Q 1/38* (2006.01)
*H04M 1/02* (2006.01)
(Continued)

(52) U.S. Cl.
CPC ............ *H04M 1/026* (2013.01); *B21D 51/16* (2013.01); *B22D 17/00* (2013.01); *B29C 45/14* (2013.01);
(Continued)

(58) Field of Classification Search
CPC .. H01Q 1/38; H01Q 1/24; H01Q 1/48; H01Q 9/42
(Continued)

(56) References Cited

U.S. PATENT DOCUMENTS

2010/0321253 A1* 12/2010 Ayala Vazquez .... H01Q 1/2258
343/702
2014/0078008 A1* 3/2014 Kang ...................... H01Q 5/35
343/702
(Continued)

FOREIGN PATENT DOCUMENTS

KR  10-2013-0022208 A  3/2013
KR  10-2014-0020670 A  2/2014
(Continued)

*Primary Examiner* — Andrea Lindgren Baltzell
(74) *Attorney, Agent, or Firm* — Birch, Stewart, Kolasch & Birch, LLP

(57) ABSTRACT

The mobile terminal having a conductive case which forms an external appearance of a terminal body, according to the present invention, comprises: a rear base which comprises a first side part; and an inner case which is mounted on the inside of the rear case and comprises a second side part, wherein the first side part and the second side part are electrically separated from each other, and the first side part and the second side part comprise a first conductive member and a second conductive member which are electrically separated from each other. Thus, it is possible to provide various forms of antennas by using a plurality of conductive members provided on the side parts.

18 Claims, 14 Drawing Sheets

(51) Int. Cl.
  *B22D 17/00* (2006.01)
  *B21D 51/16* (2006.01)
  *B29C 45/14* (2006.01)
  *H01Q 9/42* (2006.01)
  *G06F 1/16* (2006.01)
  *H01Q 1/24* (2006.01)
  *H01Q 1/48* (2006.01)
  *H04B 1/3827* (2015.01)

(52) U.S. Cl.
  CPC .......... *G06F 1/1658* (2013.01); *H01Q 1/243* (2013.01); *H01Q 1/38* (2013.01); *H01Q 1/48* (2013.01); *H01Q 9/42* (2013.01); *H04B 1/3833* (2013.01); *H04M 1/02* (2013.01)

(58) Field of Classification Search
  USPC ....................................................... 343/702
  See application file for complete search history.

(56) References Cited

U.S. PATENT DOCUMENTS

2014/0210675 A1  7/2014  Hwang et al.
2015/0155614 A1  6/2015  Youn et al.

FOREIGN PATENT DOCUMENTS

KR  10-2015-0009002 A   1/2015
KR  10-2015-0117161 A  10/2015
WO  WO 2014/190306 A1  11/2014

\* cited by examiner (a)

(b)

(a)

(b)

(a)

(b)

(a)

(b)

(a)

(b)

(a)

(b)

MOBILE TERMINAL HAVING CASE, METHOD FOR MANUFACTURING SAME

CROSS REFERENCE TO RELATED APPLICATIONS

This application is the National Phase of PCT International Application No. PCT/KR2016/010840, filed on Sep. 28, 2016, which claims priority under 35 U.S.C. 119(a) to Patent Application Nos. 10-2015-0181239, filed in Republic of Korea on Dec. 17, 2015 and 10-2016-0120017, filed in Republic of Korea on Sep. 20, 2016, all of which are hereby expressly incorporated by reference into the present application.

TECHNICAL FIELD

The present disclosure relates to a mobile terminal having a metal case and a method for manufacturing the same, and more particularly, to a mobile terminal using at least a portion of a metal case as an antenna, and a method for manufacturing the same.

BACKGROUND ART

Terminals may be divided into a mobile terminal (mobile/portable terminal) and a stationary terminal according to whether the terminal may be moved. The mobile terminal may be divided into a handheld terminal and a vehicle mounted terminal according to whether the user may carry the mobile phone directly.

The functions of mobile terminals are diversified. For example, there are functions of data and voice communication, photographing and video shooting through a camera, voice recording, music file playback through a speaker system, and outputting an image or video to a display unit. Some terminals are equipped with an electronic game play function or a multimedia player function. In particular, modern mobile terminals may receive multicast signals that provide visual content such as broadcast, video or television programs.

As functions are diversified, terminals are implemented in the form of multimedia devices supporting composite functions such as photographing or video shooting, music or video file playback, playing games, receiving broadcast, and the like.

In order to support and enhance the functions of terminals, improvement of a structural and/or software part of terminals may be considered.

Mobile terminals may be formed of a material in at least portion in terms of preventing damage to appearance and design according to the use thereof. Here, mobile terminals may be affected by electrical characteristics of an antenna which transmits or receives electromagnetic waves due to a case formed of a metal material.

DISCLOSURE

Technical Problem

The present disclosure is directed to solving the above-mentioned problems and other problems. Another object of the present disclosure is to provide a mobile terminal having a metal case and a method of manufacturing the same.

Another object of the present disclosure is to realize a side portion of a mobile terminal having a metal case, as various types of antennas.

Advantageous Effects

Effects of the mobile terminal having a metal case according to the present disclosure and the manufacturing method thereof will be described as follows.

According to at least one of the embodiments of the mobile terminal including the metal rear case and the antenna, the side surfaces of the rear case and the internal case may be used as various types of antennas.

According to at least one of the embodiments of the present disclosure, it is possible to solve the problem that it is difficult for the rear case, which is formed of a metal material, to be manufactured integrally with a non-metallic material to maintain electrical performance of the antenna.

In addition, according to at least one of the embodiments of the present disclosure, an increase in time and cost for manufacturing the case of the terminal having the meal case and inconvenience of manufacturing a cast (or mold) may be resolved.

BEST MODES

Figure 1A:
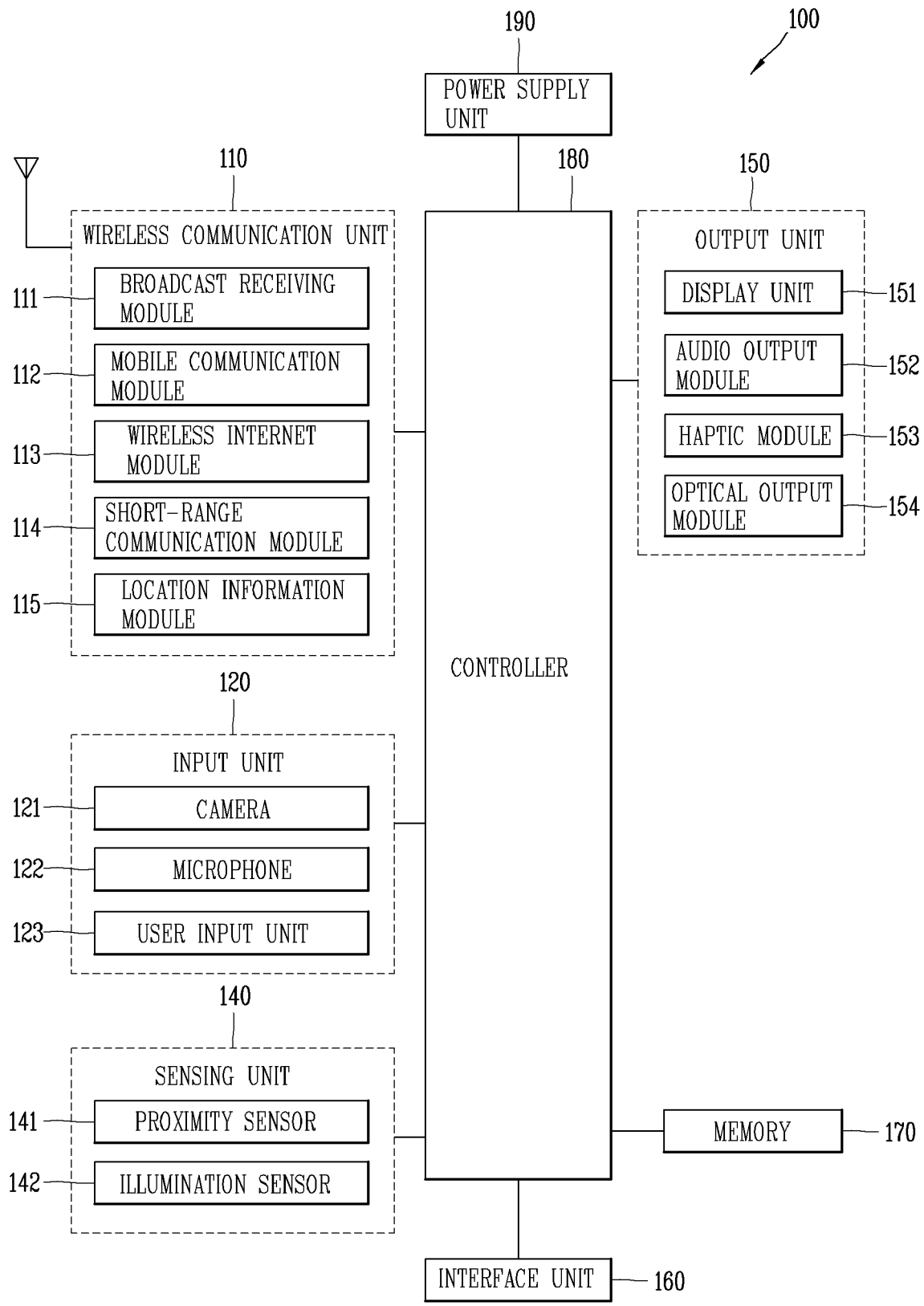
FIG. 1A is a block diagram illustrating a mobile terminal according to the present disclosure.

According to an aspect of the present disclosure, a mobile terminal having a conductive case forming an appearance of a terminal body includes a rear case (or a backside case) including a first side surface portion; and an internal case installed inside the rear case and including a second side surface portion. Here, the first and second side surface portions are electrically separated from each other. Also, the first and second side surface portions may include first and second conductive members which are electrically separated from each other so that various types of antennas may be provided using a plurality of conductive members provided on the side surface portion. Here, the first and second conductive members may be configured to operate as antennas. Also, the rear case and the internal case may further include a first rear surface portion and a second rear surface portion.

According to an embodiment, a circuit board on which an electronic component is mounted may be installed in the internal case. Here, the circuit board may include a feeding line and a ground. Or, at least one of the first and second metal members may be connected to the circuit board through the feeding line and a ground connection portion.

According to an embodiment, the second metal member may be connected to both the feeding line and the ground. Also, the first metal member and the second metal member may be electrically connected by a connection portion so that the first and second metal members may operate as radiators.

According to an embodiment, the second metal member may be connected to both the feeding line and the ground. Also, the first metal member and the second metal member may be configured to operate as radiators by coupling in a state in which the first metal member and the second metal member are electrically spaced apart from each other.

According to an embodiment, the first metal member may be connected to any one of the feeding line and the ground and the second metal member may be connected to the other of the feeding line and the ground. Also, the first metal member and the second metal member may be electrically connected by a connection portion to operate as radiators.

According to an embodiment, the first metal member may be connected to both the feeding line and the ground to operate as a radiator.

According to an embodiment, the second metal member may be connected to the feeding line and the ground at a first point and a second point. Also, the first metal member and the second metal member may be electrically connected by a connection portion at a third point, a middle point between the first and second points, to operate as radiators.

According to an embodiment, one end of the second metal member may be electrically connected to the ground. Also, the other end of the second metal member may be electrically connected to one end of the first metal member through the connection portion.

According to an embodiment, one ends of the first and second metal members may be electrically connected to any one and the other of the feeding line and the ground. Also, the other ends of the first and second metal members may be electrically connected to each other through the connection portion.

According to an embodiment, one end of the first metal member may be electrically connected to the ground and the first metal member may be connected to the feeding line at a first point spaced apart from the one end. Also, the other end of the first metal member may be opened and electrically separated from another metal member constituting the first side surface portion.

According to an embodiment, the internal case may include first internal case manufactured by die casting; and a second internal case manufactured by insert molding and installed inside the first internal case.

According to an embodiment, the second internal case may be manufactured using a non-metal material by insert molding, and the second metal member may configure a first side surface portion of the first internal case manufactured by die casting.

According to another aspect of the present disclosure, a mobile terminal having a case forming an appearance of a terminal body, wherein the case may include a rear case (or a backside case) including a rear surface portion and a side surface portion formed of a first metal material, the rear surface portion including an antenna region formed by removing a metal and accommodating an antenna; and an internal case formed of a second metal material different from the first metal material and installed inside the rear case. Here, the antenna region may be injection-molded as a non-metal member.

According to an embodiment, the rear case may be manufactured by pressing and the internal case may be manufactured by die casting.

According to an embodiment, the rear case may further include an opening exposing an installed electronic component to the outside.

According to an embodiment, a lower end of the rear case may be injection-molded as a non-metal member and the non-metal member is a metal-removed member.

MODE FOR INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
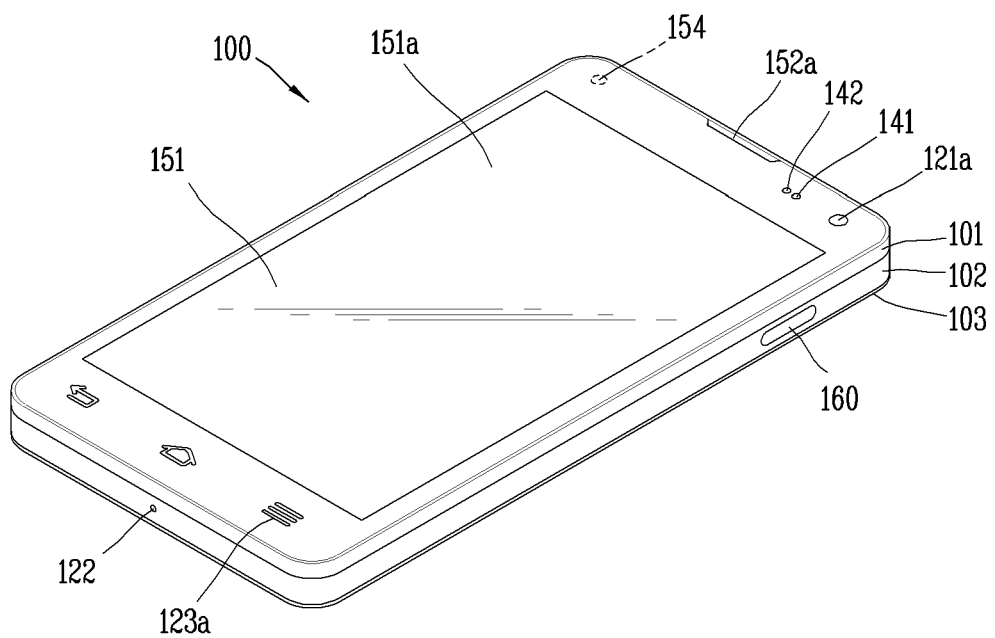
FIGS. 1B and 1C are conceptual views illustrating an example of a mobile terminal related to the present disclosure viewed in different directions.
Figure 1C:
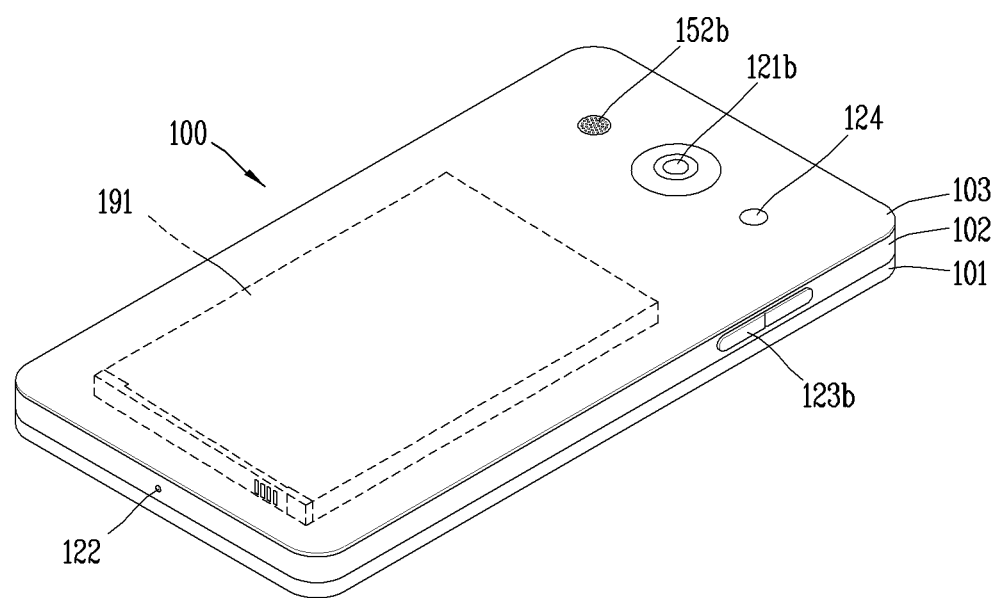

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

The power supply unit 190 may supply power required for an operation of each component upon receiving external power and/or internal power under the control of the controller 180.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, cliptype, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood as a concept of referring to the mobile terminal 100 as at least one aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

Figure 10:
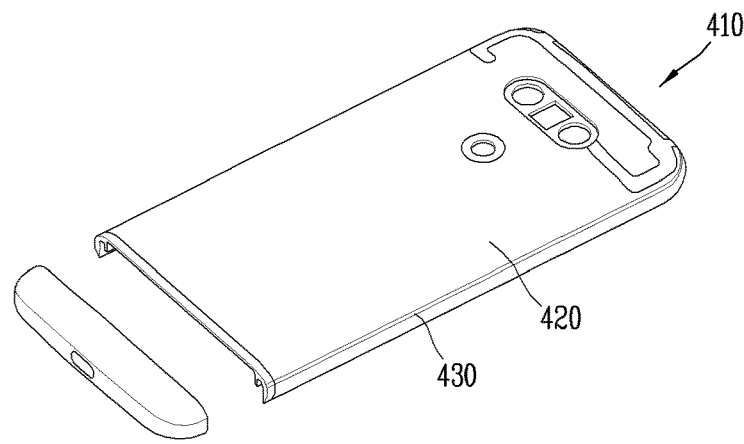
FIG. 10 illustrates a process of assembling and fastening a plurality of metal cases including various antenna elements according to the present disclosure.
Figure 10:
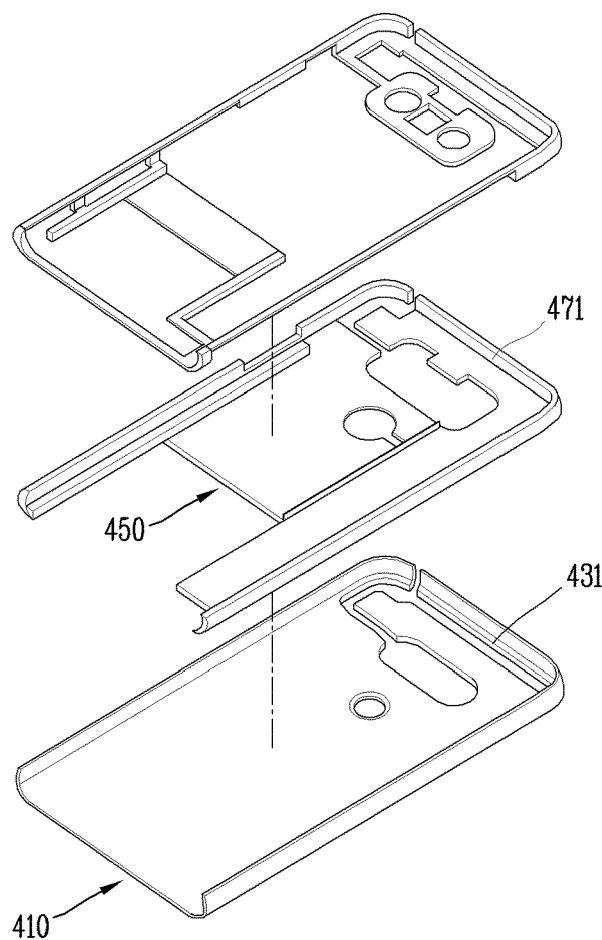

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by as magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

As described above with reference to FIG. 1A, a short-range communication technology such as Bluetooth, radio frequency identification (RFID), infrared data association (IrDA), ultra wideband (UWB), ZigBee, near field communication (NFC), wireless universal serial bus (USB), and the like, may be applied to the mobile terminal according to the present disclosure.

Meanwhile, as described above, in the present disclosure, the rear case 103 may be formed of a metal in terms of prevention of appearance damage due to use and design. Here, in the case of the antenna which is electrically connected to the wireless communication unit 110 and transmits or receives electromagnetic waves to and from or through a free space, the periphery of the antenna must be formed of a non-metal material. Here, a problem arises in that it is difficult for the metal rear case to be integrally manufactured.

In addition to the problem, when the rear case 103 is manufactured by numeric control (NC) machining, time and cost may be increased. Meanwhile, when the rear case 103 is manufactured by die-casting, making mold is cumbersome and design completeness is low. Therefore, the present disclosure is to propose a mechanism for solving such a problem.

Hereinafter, the mobile terminal 100 of the present disclosure having an antenna and a rear case will be described in detail with reference to FIGS. 2 and 3.

The present disclosure proposes a structure in which side surface portions of the internal case and the rear case of the mobile terminal are used as metal members of an antenna. In this regard, the internal case and the rear case may be formed of different materials, and such a structure may also be referred to as a hybrid skin cover. Meanwhile, a metal of at least a portion of the rear case may be removed to provide an antenna region accommodating the antenna. The rear case coupled to the antenna region may also be referred to as a hybrid skin cover.

Figure 2:
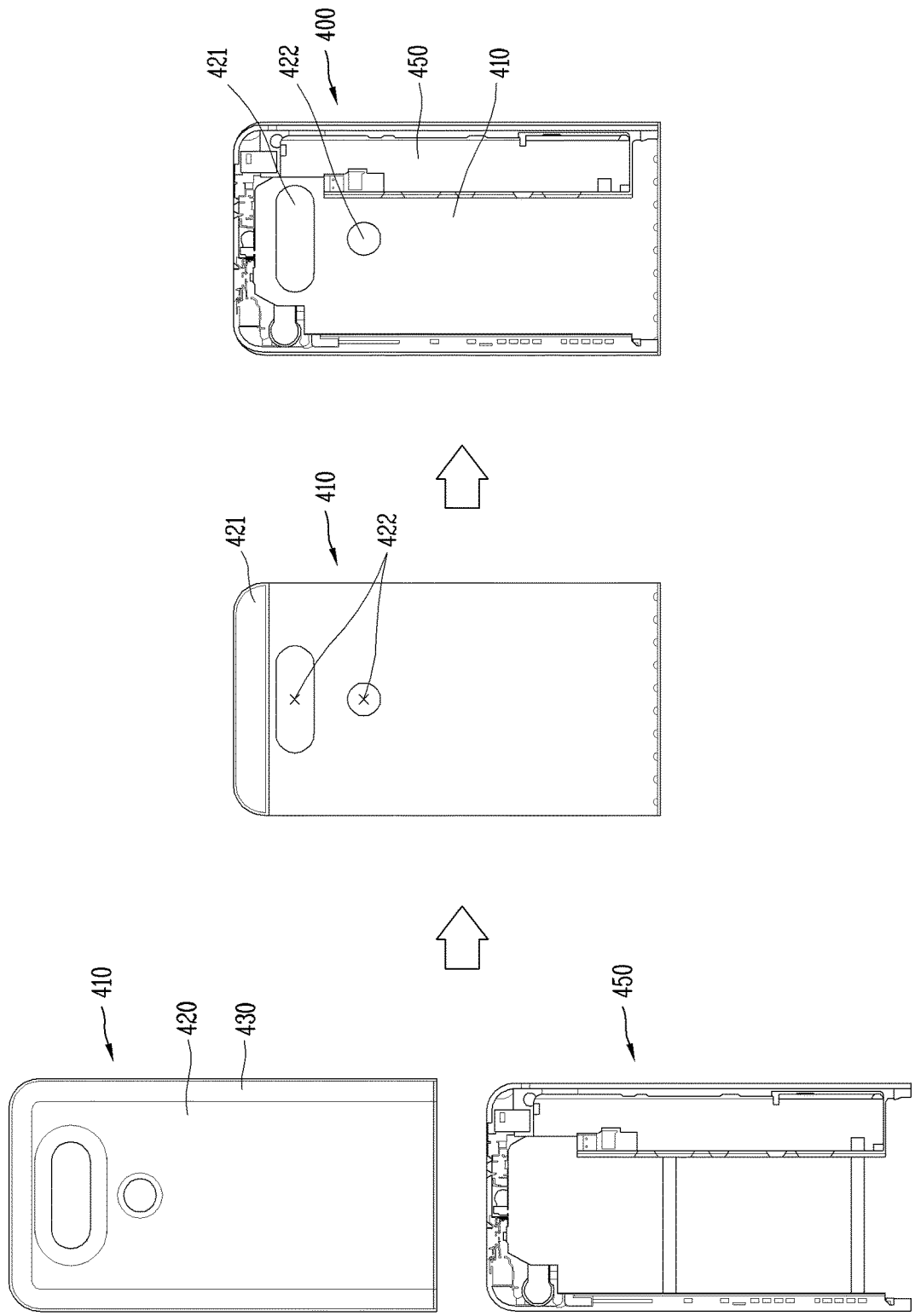
FIG. 2 illustrates a process of machining (or fabricating) an internal case and a rear case in a mobile terminal according to the present disclosure.

FIG. 2 illustrates a process of machining an internal case and a rear case of a mobile terminal according to the present disclosure.

Figure 3:
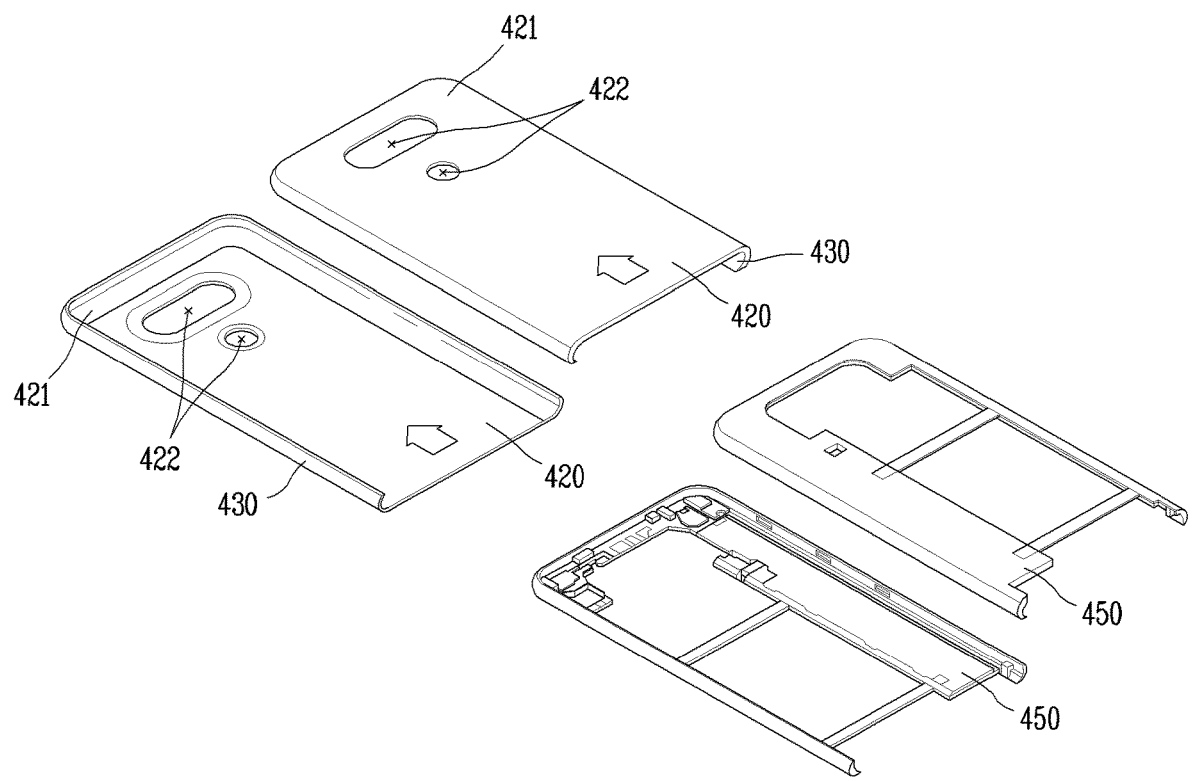
FIG. 3 illustrates a process of assembling an internal case and a rear case to a mobile terminal according to the present disclosure.

FIG. 3 illustrates a process of assembling an internal case and a rear case to a mobile terminal according to the present disclosure.

Figure 4:
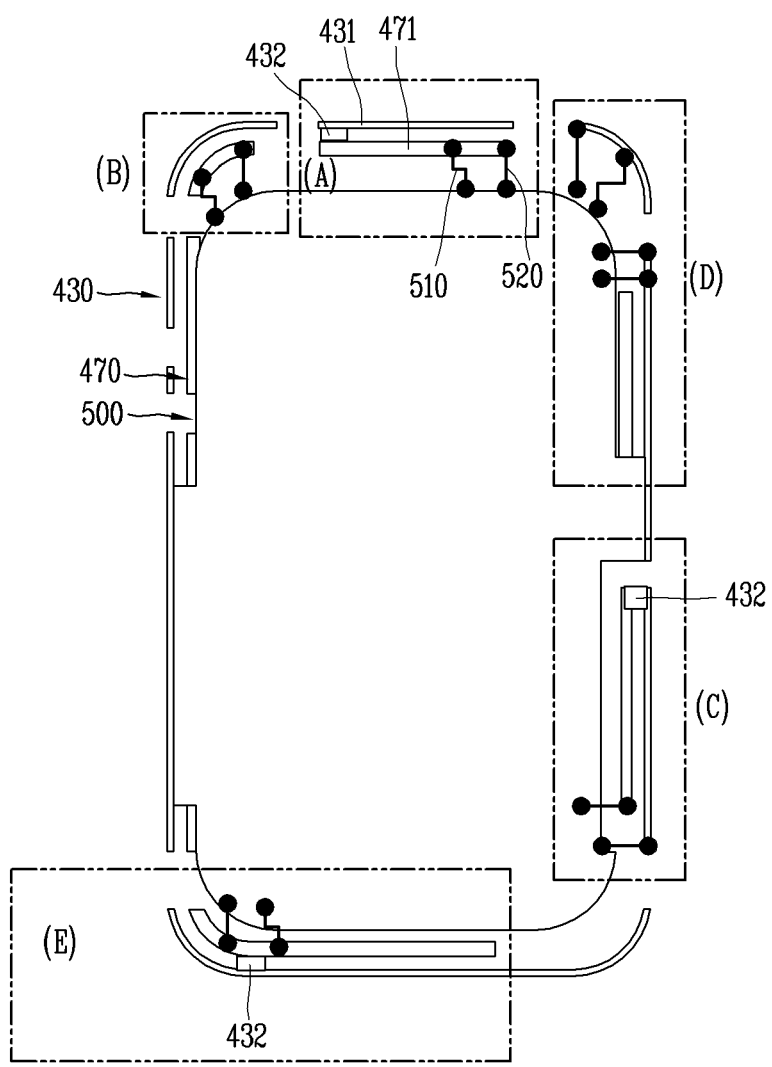
FIG. 4 is a conceptual view illustrating a connection relationship between metal members and a feeder and a ground in a mobile terminal including a rear case and an internal case according to the present disclosure.

FIG. 4 is a conceptual view illustrating a connection relationship between metal members and a feeder and a ground in a mobile terminal including a rear case and an internal case according to the present disclosure.

Referring to FIGS. 2 to 4, the mobile terminal 400 includes a rear case 410 and an internal case 450. The rear case 410 includes a first rear surface portion 420 and a first side surface portion 430 formed of a first metal material.

The first rear surface portion 420 includes an antenna region 421 from which the metal is removed, and the antenna is accommodated in the antenna region 421. In addition, the first rear surface portion 420 may further include an opening 422 for exposing a built-in electronic component to the outside. The first side surface portion 430 may include a first metal member 431 which is electrically separated.

The internal case 450 is formed of a second metal material, which is different from the first metal material, and is mounted inside the rear case 410. Here, the internal case 450 includes a second rear surface portion 460 and a second side surface portion 470 formed of the second metal material. According to an embodiment of the present disclosure, the first metal material may be at least one of aluminum (Al), steel use stainless (SUS), and titanium (Ti), and the second metal material may be magnesium (Mg). However, the first and second metal materials are not limited thereto and may be any other metal materials as needed.

In addition, a circuit board 500 on which an electronic component is mounted may be installed on the internal case (450). The circuit board 500 may be connected to the rear case 410 or the internal case 450 through a feeding line 510 and a ground 520.

Meanwhile, the second rear surface portion 460 includes a metal region in which the metal is formed and a non-metal region in which the metal is not formed. The second side surface portion 470 may include second metal members 471 electrically separated from each other.

Referring to FIG. 4, the first and second side surface portions 430 and 470 are electrically spaced apart from each other, and the first metal member 431 and the second metal member 471 are configured to operate as antennas. Meanwhile, the antenna accommodated in the antenna region 421 and the antennas operated by the first and second metal members 431 and 471 may be different. Here, the first metal member 431 and the second metal member 471 may be electrically connected by a connection portion 432. Here, the connection portion 432 may be a connecting means implemented by electric bonding.

In a state in which the first metal member 431 and the second metal member 471 are electrically spaced apart from each other, the first metal member 431 and the second metal member 471 may operate as radiators by coupling.

Antennas indicated by (A) to (E) in FIG. 4 may be referred to as (A) a folded antenna element, (B) a parasitic coupling antenna element, (C) a loop antenna element, (D) a monopole antenna element, and (E) a two-branch monopole antenna element, respectively.

As illustrated in FIG. 4, five types of antennas may be disposed at different positions on the side surface of the mobile terminal. However, the arrangement positions are not limited to the example illustrated in FIG. 4 but may be variously modified according to applications.

Meanwhile, FIGS. 5 to 9 illustrate graphs of return loss results according to various types of antennas using metal members of the rear case and the internal case and frequencies according to the present disclosure.

Figure 5:
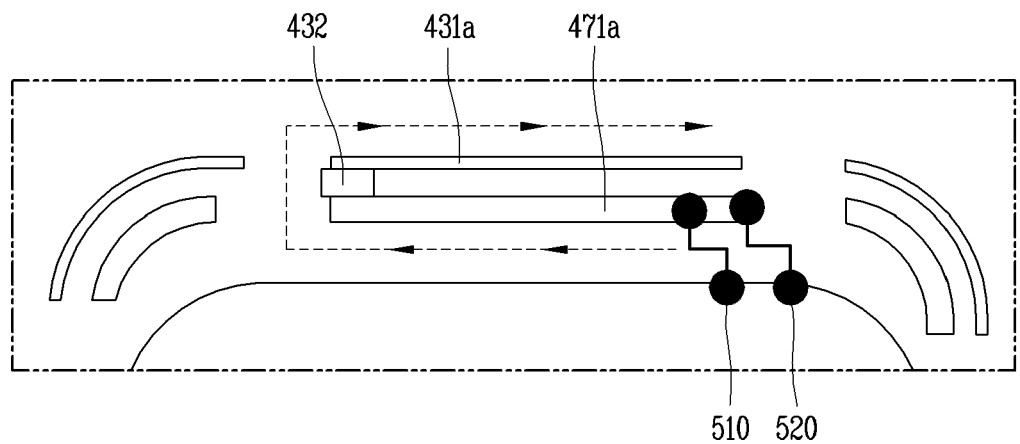
FIG. 5 illustrates a structure of a folded antenna element using a metal member of a side case and a graph of return loss according to the present disclosure.
Figure 5:
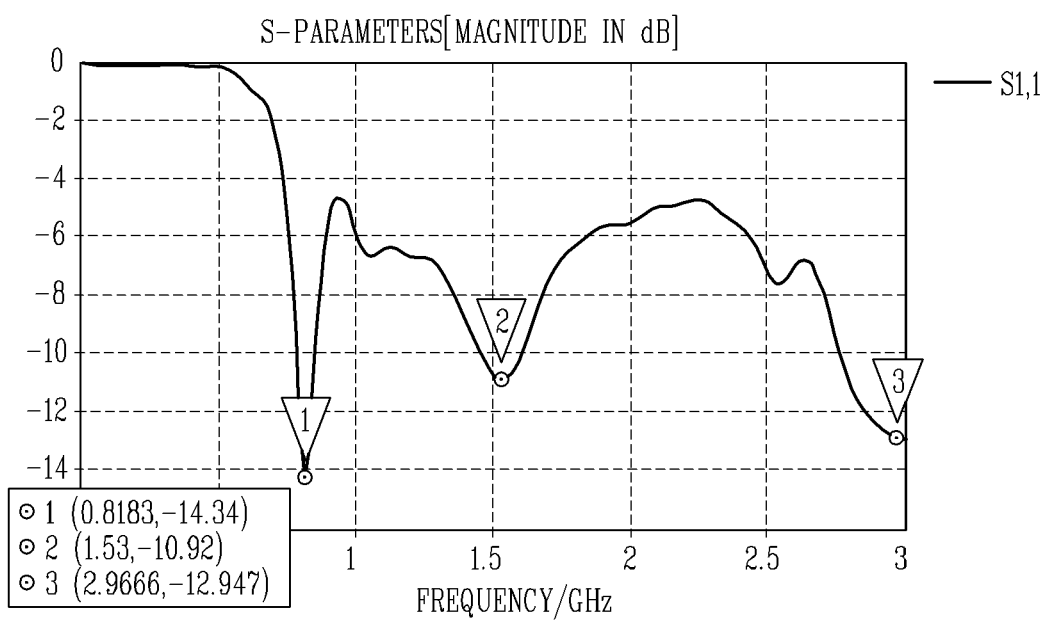

First, FIG. 5 illustrates a structure of a folded antenna element using a metal member of a side case according to the present disclosure and a graph of return loss.

In FIG. 5, (a) represents a folded antenna element as mentioned above. In this regard, the second metal member 471a is connected to both the feeding line 510 and the ground 520. The first metal member 431a and the second metal member 471a are electrically connected by the connection portion 432 so that the first and second metal members 431a and 471a serves as radiators. In this connection, current flows from the first metal member 431a to the second metal member 471a through the connecting portion 432. Therefore, the folded antenna element operates as an antenna in a resonance frequency band having a resonance length corresponding to the length of the path.

Figure 7:
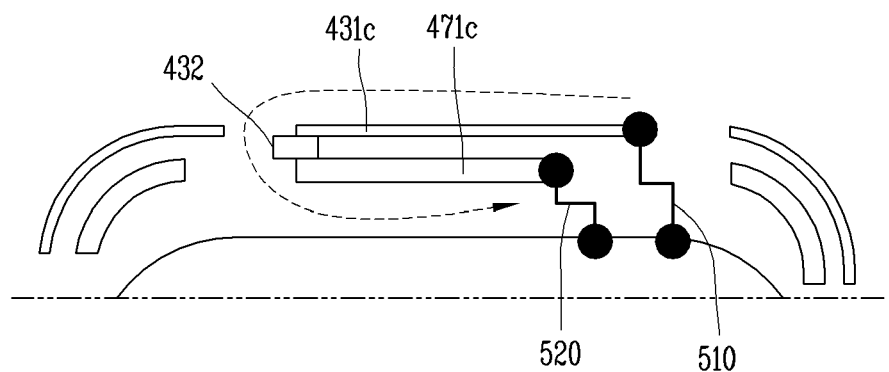
FIG. 7 illustrates a structure of a loop antenna element using a metal member of a side case and a graph of a return loss result according to the present disclosure.
Figure 7:
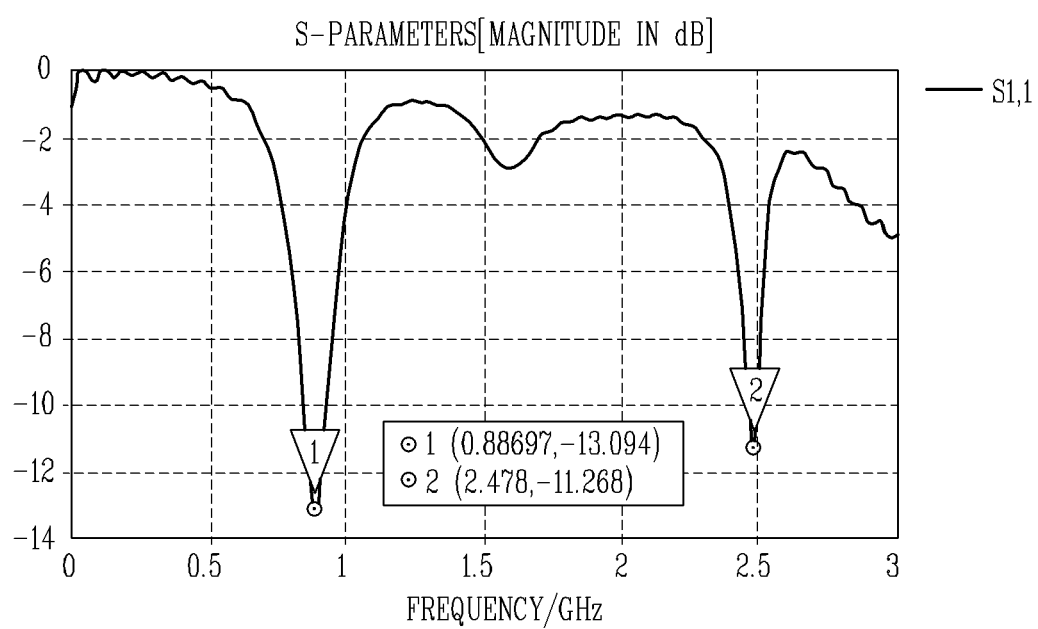

More specifically, as illustrated in (a) of FIG. 7, it is most advantageous in terms of radiation efficiency to configure the first and second metal members 431a and 471a to be mutually connected at the end part. That is, an antenna having a longer electrical length may improve radiation performance. Therefore, the antenna length may be increased by electrically connecting the first and second metal members 431a and 471a forming the side surface of the rear case 410 and the internal case 450.

Meanwhile, in order to optimize performance such as return loss, or the like, as well as radiation efficiency, in a specific frequency band, a connection point with the feeding line 510 may be variably adjusted. Also, a connection point with the ground 520 may be variably adjusted. Also, a connection point of the connection portion 432, which is an electrical connection between the first and second metal members 431a and 471a, may be variably adjusted.

Meanwhile, (b) of FIG. 5 illustrates a graph of return loss of the folded antenna element. It can be seen that the antenna element resonates in first to third frequency bands. For example, the first and second frequency bands may correspond to an LTE low band and a mid-band. Meanwhile, the third frequency band may correspond to a certain frequency band for a new mobile communication service in the future.

Figure 6:
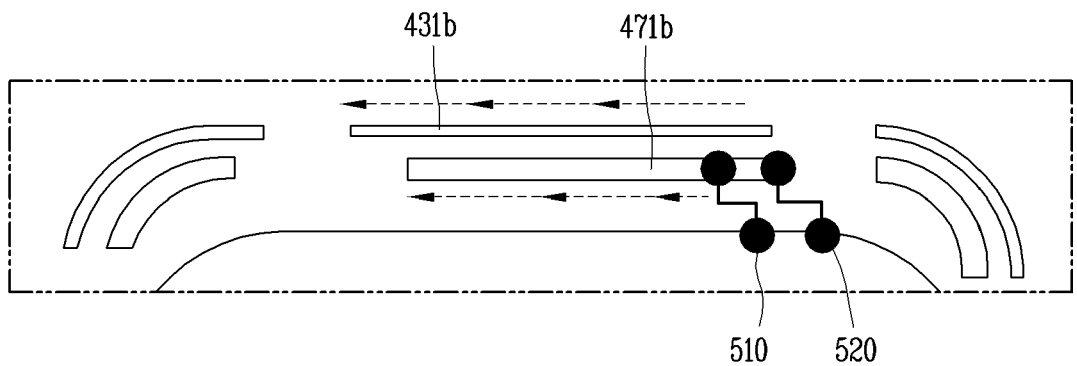
FIG. 6 illustrates a structure of a parasitic coupling antenna element using a metal member of a side case and a graph of a return loss result according to the present disclosure.
Figure 6:
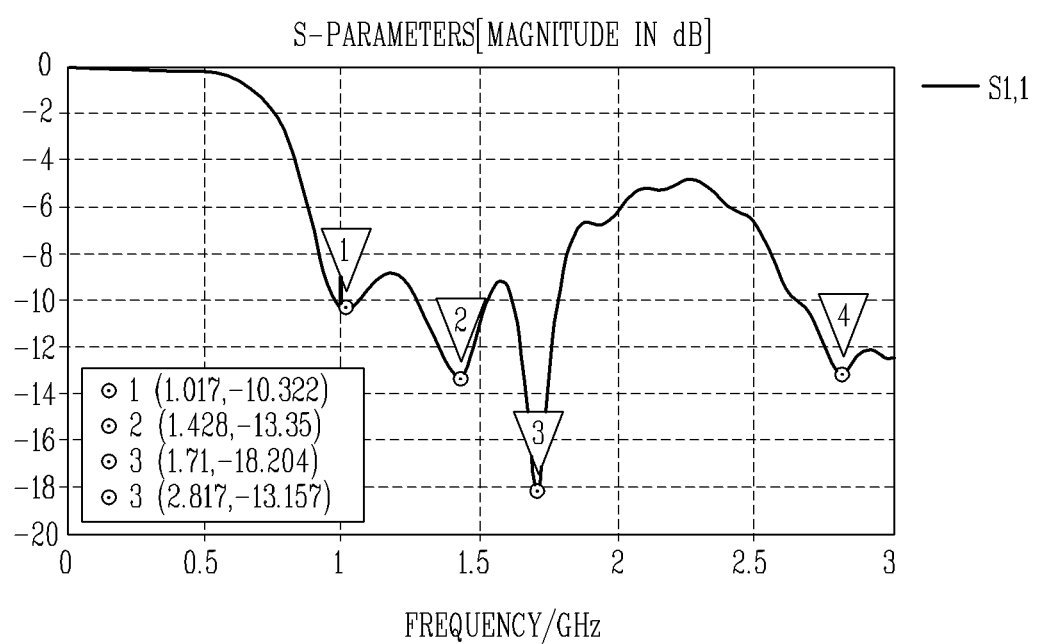

FIG. 6 illustrates a structure of a parasitic coupling antenna element using a metal member of the side case according to the present disclosure and a graph of a result of return loss.

As mentioned above, (a) of FIG. 6 corresponds to a parasitic coupling antenna element. The second metal member 471b may be connected to both the feeding line 510 and the ground 520. Here, in a state in which the first metal member 431b and the second metal member 471b are electrically spaced apart from each other, the first and second metal members 431b and 471b may serve as radiators through coupling. Here, it is preferable that a distance between a first point and a second point where the second metal member 471b is connected to the feeding line 510 and the ground 520 is spaced apart from each other to improve radiation efficiency. For example, the first point and the second point may correspond to one end and the other end of the second metal member 471b.

Meanwhile, instead of using a connection unit such as electrical bonding, or the like, a non-conductive holding portion may be filled between the two metal members. For example, the non-conductive holding portion may be formed of resin.

Radiation performance of the structure illustrated in (a) of FIG. 6 may have a slightly lower than the folded antenna element described above. However, the parasitic coupling antenna element may exhibit broadband or multi-band characteristics by coupling. As illustrated, since directions of the currents flowing in the first and second metal members 431b and 471b are the same, the parasitic coupling antenna elements may exhibit broadband or multi-band characteristics.

Here, an additional multi-band resonance mode may be added to implement wideband characteristics using the parasitic coupling antenna element. In addition, there is no need for an electrical connection means between the metal members, which is advantageous in terms of productivity and performance deterioration due to external impact.

Meanwhile, unlike the illustrated example, the first metal member 431b may be connected to both the feeding line 510 and the ground 520. Or, the first and second metal members 431b and 471b may be connected to the feeding line 510 and the ground 520 one by one. That is, various forms of feeding line connection and ground connection are possible according to fastening structures with the rear case, the internal case, the terminal body providing the ground, and the circuit board.

(b) of FIG. 6 is a graph illustrating a result of return loss of the parasitic coupling antenna element. It can be seen that the parasitic coupling antenna element resonates in the first to fourth frequency bands. For example, the first to third frequency bands may correspond to an LTE low band, a mid-band, and a high band. Meanwhile, the fourth frequency band may correspond to a certain frequency band for a new mobile communication service in the future.

Next, FIG. 7 illustrates a structure of a loop antenna element using a metal member of the side case according to the present disclosure and a graph of a result of return loss.

As described above, (a) of FIG. 7 corresponds to a loop antenna element. That is, the first metal member 431c is connected to any one of the feeding line 510 and the ground 520, and the second metal member 471c may be connected to the other of the feeding line 510 and the ground 520. Here, the first metal member 431c and the second metal member 471c are electrically connected by the connection portion 432 so that the first and second metal members 431c and 471c operate as radiators.

In order to increase an electrical length of the loop antenna, the connection portion 432 is preferably disposed at the ends of the first and second metal members 431c and 471c. That is, one end of each of the first and second metal members 431c and 471c is electrically connected to one and the other of the feeding line 510 and the ground 520. The other ends of the first and second metal members 431c and 471c may be electrically connected to each other through the connection portion 432.

The loop antenna element having such a structure is advantageous in that it is not sensitive to the size of the ground plane of the mobile terminal or the influence of a peripheral object. Therefore, there is an advantage that the antenna performance is not degraded even when the user grips the mobile terminal with his hand.

Meanwhile, (b) of FIG. 7 illustrates a graph of a result of return loss of the loop antenna element. It can be seen that the parasitic coupling antenna element resonates in the first and second frequency bands. For example, the first frequency band may correspond to an LTE low band. Meanwhile, the second frequency band may correspond to one of an LTE high band, an ISM band, and a certain frequency band for a new mobile communication service in the future.

Figure 8:
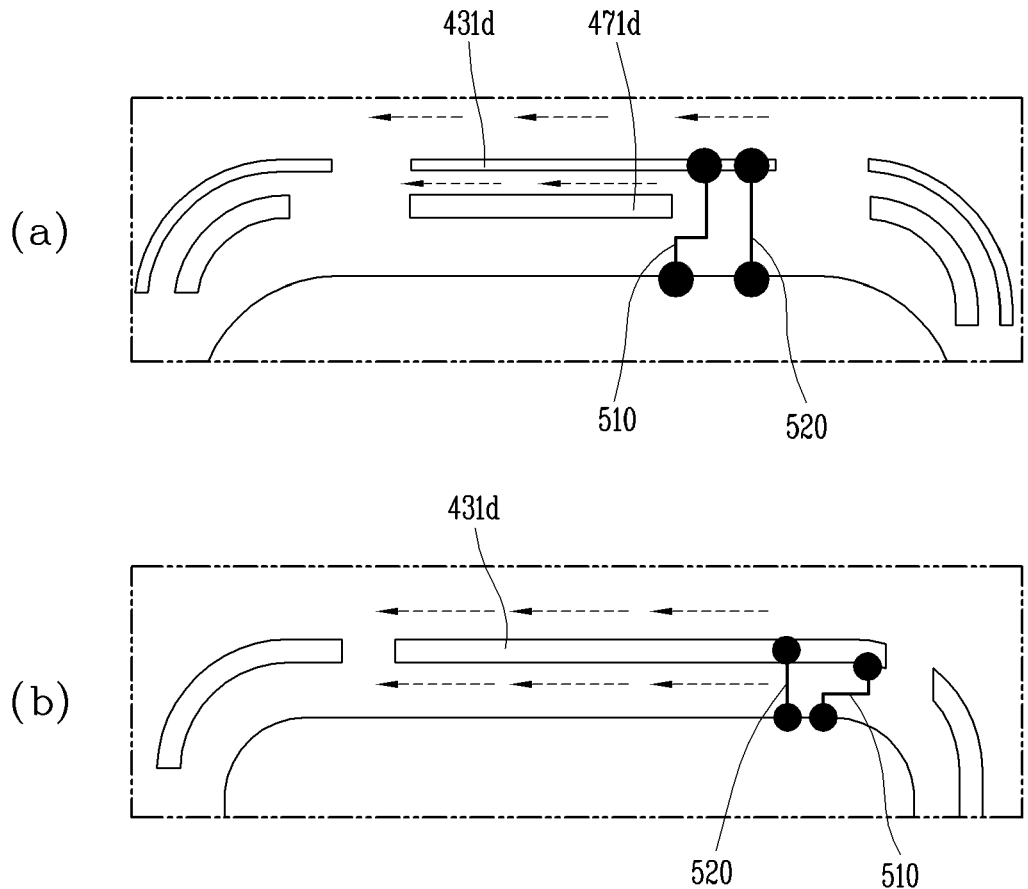
FIG. 8 illustrates a structure of a monopole antenna element using a metal member of a side case and a graph of a return loss result according to the present disclosure.
Figure 8:
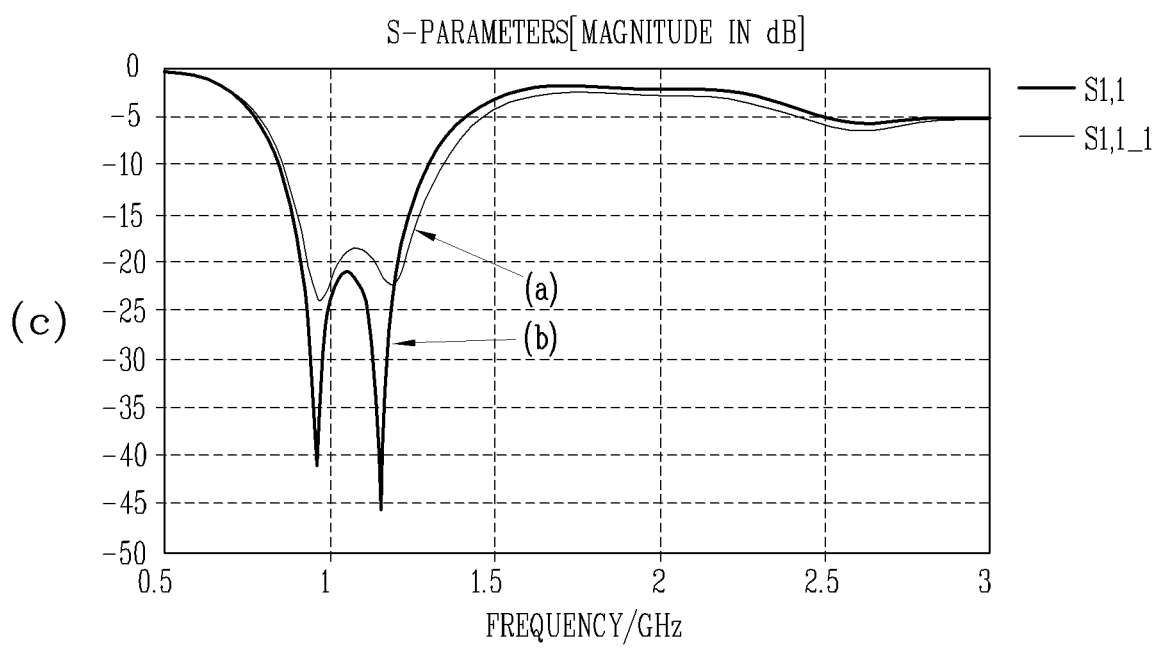

FIG. 8 illustrates a structure of a monopole antenna element using a metal member of the side case according to the present disclosure and a graph of a result of return loss.

As described above, (a) and (b) of FIG. 8 correspond to a monopole antenna element. As illustrated in (a) of FIG. 8, a first metal member 431d is connected to both the feeding line 510 and the ground 520 so that the first metal member 431d may operate as a radiator. Such a monopole antenna element does not require an electrical connection means between metal members like the above-mentioned parasitic coupling antenna element. However, a non-conductive holding part may be disposed to support the metal members and may be formed of, for example, a resin.

Also, as illustrated in (b) of FIG. 8, the monopole antenna element may be implemented by only the first metal member 431d without the second metal member 471d. This is because, even when a large amount of current flows through the second metal member 471d, current flowing through the second metal member 471d does not directly contribute to radiation.

More specifically, one end of the first metal member 431d may be electrically connected to the ground 520, and the first metal member 431d may be electrically connected to the feeding line (not shown) at a first point spaced apart from the one end. Also, the other end of the first metal member 431d may be opened and electrically separated from other metal members constituting a first side surface portion. Here, a dielectric corresponding to an insulator may be disposed in the separated space, allowing the first side surface portion to form an overall appearance of the terminal.

Meanwhile, (c) of FIG. 8 is a graph illustrating a result of return loss of the loop antenna element. It can be seen that the monopole antenna element resonates in the first and second frequency bands. For example, the first and second frequency bands may correspond to an LTE low band and a mid-band. In this regard, as illustrated in (b) of FIG. 8, the monopole element is implemented by only the first metal member 431d, without the second metal member 471d, to obtain low reflection loss characteristics and a high antenna gain.

Figure 9:
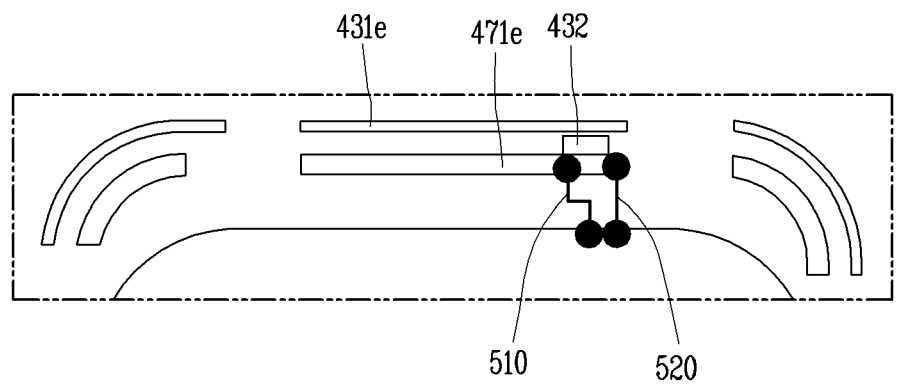
FIG. 9 illustrates a structure of two-branch monopole antenna element using a metal member of a side case and a graph of a return loss result according to the present disclosure.
Figure 9:
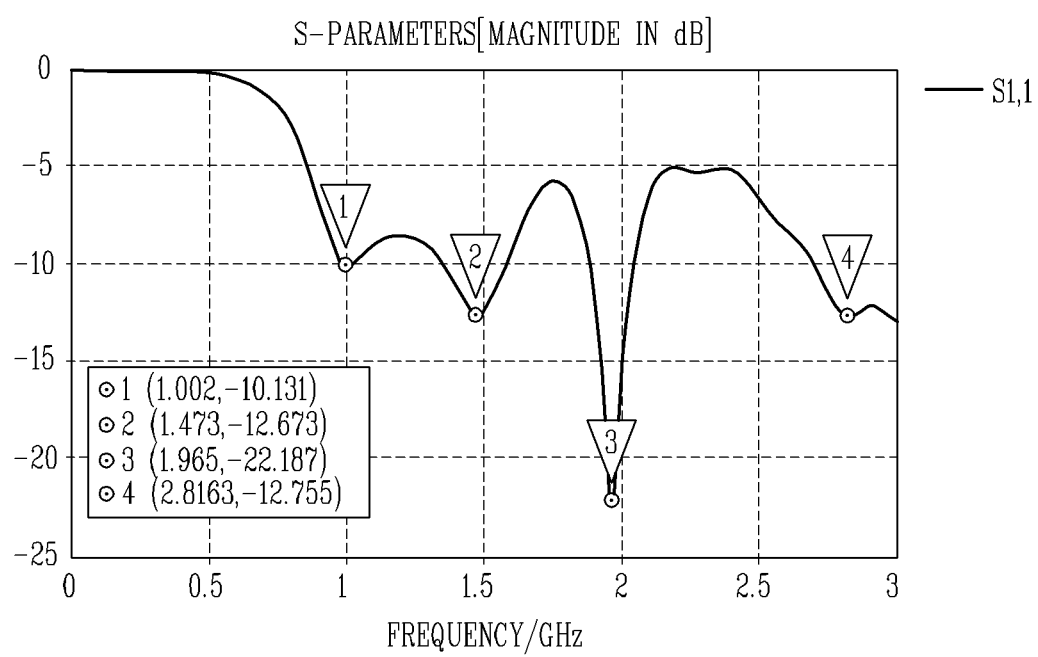

Finally, FIG. 9 is a graph illustrating a structure of a two-branch monopole antenna element using a metal member of a side case according to the present disclosure and a graph of a result of return loss.

In (a) of FIG. 9, two-branch monopole antenna elements are illustrated. That is, since the antenna is connected between a feeding line of the connection portion 432 and the ground, the antenna may be called a branch monopole antenna.

In this regard, the second metal member 471e is connected to the feeding line 510 and the ground 520 at a first point and a second point. Also, the first metal member 431e and the second metal member 471e are electrically connected at a third point that is an intermediate point of the first and second points by the connection portion 432, and thus, the first and second metal members 431e and 471e may operate as radiators.

Referring to FIGS. 4, 5 and 9, the two branch monopole antenna elements have an increased antenna length, compared to the folded antenna element described above. However, the branch monopole antenna elements exhibit broadband characteristics or double resonance characteristics due to the first and second metal members 431e and 471e having different lengths. Here, when the different resonance frequency bands based on the first and second metal members 431e and 471e are adjacent to each other, they exhibit broadband characteristics. Meanwhile, when different resonance frequency bands based on the first and second metal members 431e and 471e are not adjacent to each other, double resonance characteristics are exhibited. Therefore, the broadband characteristics or the dual resonance characteristics may be variously adjusted by adjusting the lengths of the first and second metal members 431e and 471e.

Meanwhile, (b) of FIG. 9 illustrates a graph of a result of return loss of the branch monopole antenna element. It can be seen that the branch monopole antenna element resonates in the first and second frequency bands. For example, the first to third frequency bands may correspond to an LTE low band, mid-band, and high band. Meanwhile, the fourth frequency band may correspond to a certain frequency band for a new mobile communication service in the future.

As described above, the antennas having various structures utilizing the rear case 410 and the side surfaces of the internal case 450 proposed by the present disclosure have been described. Meanwhile, a material and a machining method of the rear case 410 and the internal case 450 of the present disclosure will be described as follows. In this regard, a process of machining the internal case and the rear case in the mobile terminal and a process of assembling the internal case and the rear case in the mobile terminal according to the present disclosure of FIGS. 2 and 3 will be referred to.

According to an embodiment of the present disclosure, the first metal material of the rear case 410 is at least one of aluminum (Al), steel use stainless (SUS), and titanium (Ti), and the second material of the internal case 450 may be aluminum (Al) or magnesium (Mg). However, the first and second metal materials are not limited thereto and may be selected from any other metal materials as needed.

The aluminum member has an advantage that an oxide film may be formed through anodizing, and thus, corrosion due to use may be prevented. The SUS member corresponds to a metal member formed by including chromium in iron in order to strengthen corrosion resistance. SUS has a beautiful surface and excellent corrosion resistance, and thus, SUS may be used for various purposes by making the use of a unique surface thereof, without performing a surface treatment such as painting and coloring. A titanium member has excellent corrosion resistance but disadvantageously has low strength. However, strength of the titanium member may be improved by an alloy.

Further, since the magnesium member may be used for applications requiring high strength and light weight, it may be adopted as an internal case. Further, the magnesium member is suitable for die casting.

Meanwhile, the rear case 410 and the internal case 450 may be assembled in a sliding manner as illustrated in FIG. 5 in order to create a uni-body structure.

Meanwhile, the rear case 410 is manufactured by press working, and the internal case 450 may be manufactured by di-casting.

Meanwhile, the rear case 410 and the internal case 450 may be coated with a highly conductive material to ensure high conductivity as antennas after the machining operation. In addition, a partial region of the rear case 410 and the internal case 450, which includes the first and second metal members 431 and 471, may be coated with a highly conductive material to ensure high conductivity as an antenna.

The antenna region 421 is a region corresponding to a region of the first rear surface portion 420, which corresponds to the region in which the antenna is accommodated. Meanwhile, the antenna region 420 may be injection-molded as a non-metallic member. Here, the non-metallic member is a plastic member, and the plastic member may be synthesized to have a low dielectric constant to prevent deterioration of characteristics of the antenna.

Referring to FIGS. 2 and 3, a process of manufacturing and assembling of the case is as follows. First, as illustrated in a first the case is manufactured and assembled as follows. First, as illustrated in the first step of FIG. 2, the rear case 410 and the internal case 450 are manufactured by press working and die casting, respectively.

Next, as illustrated in FIG. 3, the internal case 450 is inserted into the rear case 410 and assembled into an integrated case. Here, the drawings illustrated in FIG. 5 correspond to drawings of a process of inserting the internal case 450 into the rear case 410, viewed from the front surface and the rear surface. Here, as illustrated in the second step of FIG. 2, the internal case 450 is inserted into the rear case 410 and assembled.

Next, as illustrated in the third step of FIG. 2, after the rear case 410 is combined with the internal case 450, a connection portion may be formed to be connected. For example, a die-casting connection portion corresponding to an additional region of the internal case 450 for bonding the rear case 410 and the internal case 450 may be removed.

Meanwhile, a process of assembling a plurality of cases having a side case implemented as various antenna elements described above will be described with reference to FIGS. 2 to 9. In this regard, FIG. 10 illustrates a process of assembling and fastening a plurality of metal cases including various antenna elements according to the present disclosure.

First, (a) of FIG. 10 illustrates a rear case 410 having a first rear surface portion 420 and a first side surface portion 430 according to the present disclosure. As described above, the rear case 410 may be manufactured by press working. An appearance of the rear case 410 may be formed through a preprocessing pressing method, and an inner surface of the rear case 410 may be implemented to have a curved undercut shape. For example, the rear case 410 may be an aluminum-based Al 5182 H34. Meanwhile, the rear case 410 may be press-worked in the form of a mold with a lower DECO portion so as to be fastened as a set.

Next, (b) of FIG. 10 illustrates a structure in which the rear case 410 and the internal case 450 according to the present disclosure are fastened together. At least a part of the side surfaces of the rear case 410 and the internal case 410 are realized in the form of first and second metal members 431 and 471, respectively, to form an antenna. Next, a non-metallic structure in the form of an insert mold may be fastened to the inside of the internal case 450. Here, the internal case 450 may be referred to as a first internal case 450, and the non-metal structure in the form of an insert mold may be referred to as a second internal case. Here, the side surface portion of the internal case 450 may be formed of the second metal member as described above. Meanwhile, the internal case 450 corresponding to the internal supporting structure may be realized by a die casting method. For example, the internal case 450 may be formed of a metal material of Al MG 5.

More specifically, the rear case 410, which corresponds to the appearance and machined by pressing, and the internal case 450, which corresponds to the inside and bonded by casing, may be required to be bonded as well as fastened. To this end, a casting bonding portion of the internal case 450 is primer-coated, and the rear case 410 and the internal case 450 are assembled by a press-casting sliding method. In addition, the rear case 410 and the internal case 450 are finally bonded through clamping, chamfering, and drying process, and resistance characteristics are maintained such that electric internal loss is minimized.

Next, as described above, the non-metallic structure in the form of an insert mold may be fastened to the inside of the internal case 450. In this regard, the insert mold corresponds to manufacturing a necessary part such as a camera part, a hook, and the like, in an injection-mold form. Finally, CNC shaping, exterior painting (MD), and diamond-cutting may be performed. Here, the CNC shaping may include upper surface slit portion machining, a rear casting portion bridge segmenting, and the like. In addition, the CNC shaping may include inner and upper surface CNC machining, washing and drying in a state in which the rear case 410 and the internal case 450 are fastened. Also, the CNC shaping may include an exterior front surface CNC machining, left/right/upper surface CNC machining, bottom CNC machining, a DECO inner CNC machining, a hole CNC machining, and the like.

Figure 11:
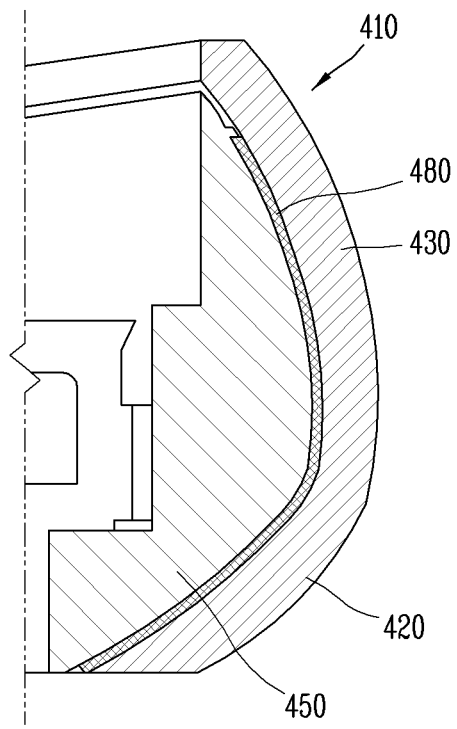
FIG. 11 illustrates a method of bonding an internal case and a rear case according to an embodiment of the present disclosure.
Figure 11:
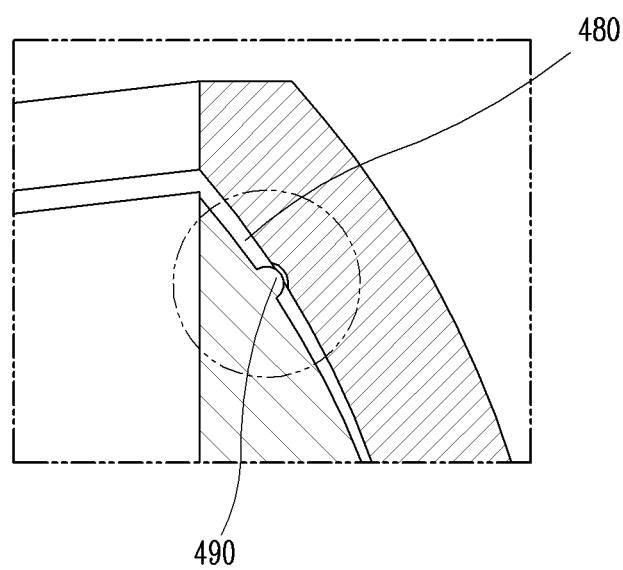

FIG. 11 illustrates a method of bonding an internal case and a rear case according to an embodiment of the present disclosure.

Referring to (a) of FIG. 11, the rear case 410 and the internal case 450 may be bonded by a conductive bonding liquid 480. The rear case 410 manufactured by press working and the internal case 450 manufactured by die casting must be bonded by the conductive bonding liquid 480 for improving antenna performance. That is, when the rear case 410 and the internal case 450 are incompletely coupled, antenna performance is affected by separation of the metal corresponding to the ground plane. Therefore, the rear case 410 and the internal case 450 must be adhered by the conductive bonding liquid 480. As illustrated in FIG. 6A, the conductive bonding liquid 480 may be adhered to the internal case 450 at both the first rear surface portion 420 and the first side surface portion 430 of the rear case 410.

Referring to (b) of FIG. 11, the internal case 450 may include a separator 490 to prevent overflow of the conductive bonding liquid 480 when the internal case 450 is combined with the rear case 410 by the conductive bonding liquid 480. For example, the separator 490 may be in the form of a projection. The separator 490 may be used to align a position when the rear case 410 and the internal case 450 are combined.

Figure 12:
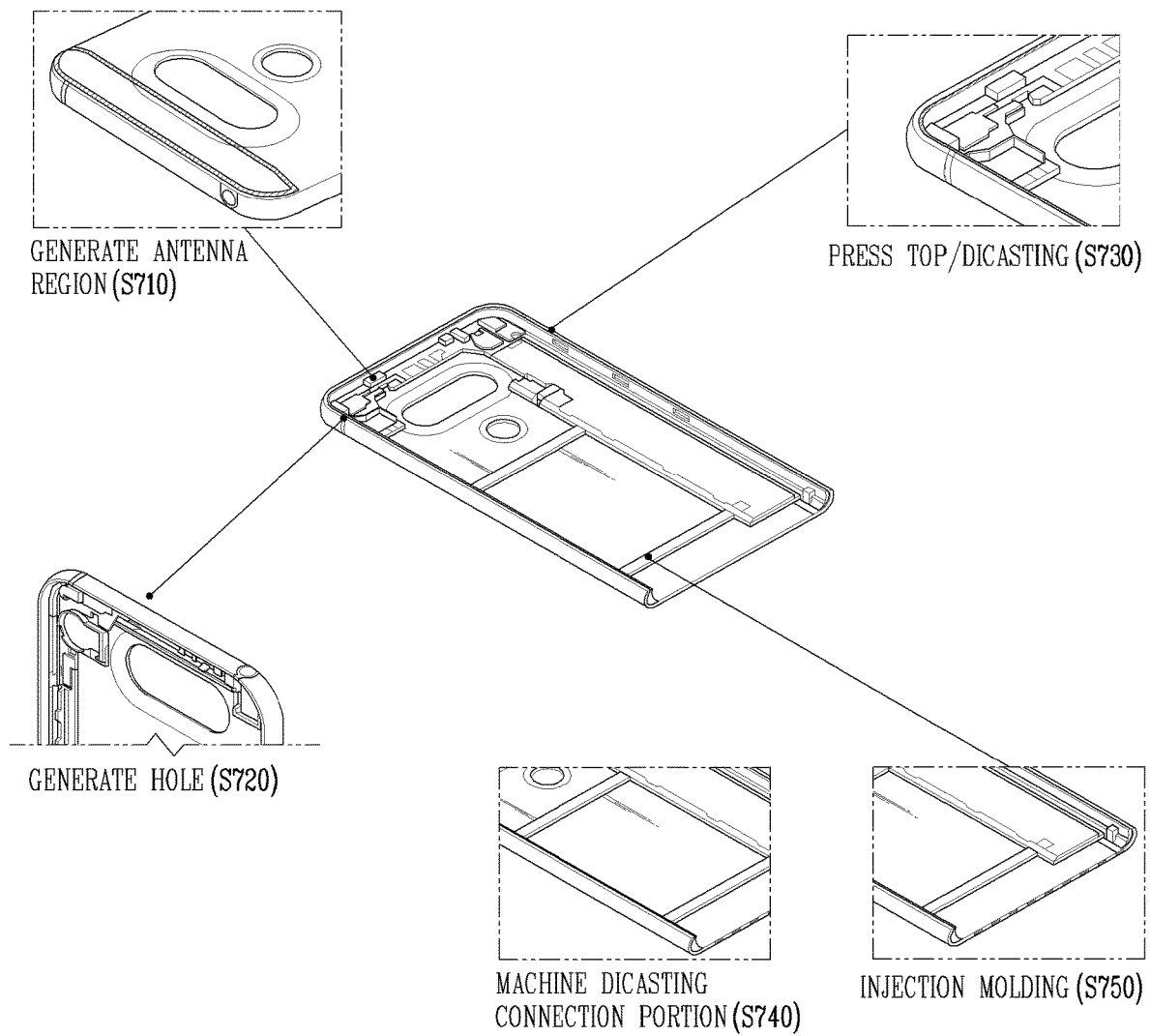
FIG. 12 is a conceptual view illustrating a slit machining process according to an embodiment of the present disclosure.

FIG. 12 is a conceptual view illustrating a slit machining process according to an embodiment of the present disclosure. The slit machining process includes a metal removing process before installation of the internal case and post-processing after installation of the internal case. Here, the respective processes are not limited to the order as described but may be freely changed according to convenience in the manufacturing process.

The metal removing process includes an antenna region generating process S710 and a hole generating process S720. Also, the post-processing includes a press top/die casting portion machining process S730, a die-cast connection portion machining process S740, and an injection molding process S750.

The antenna region generating process S710 is a process of machining a slit corresponding to the antenna region in the first rear surface portion 420. That is, in the antenna region generating process S710, a portion of the first rear surface portion 420 may be cut to form a slit in the antenna region 421, for example.

The hole generating process S720 is a process for machining holes required for the first side surface portion 430. That is, in the hole generating process (S720), a connector hole for an external interface of the mobile terminal may be generated on the side surface portion 420.

In the press top/die casting portion processing process S730, the first side surface portion 430 of the rear case 420 pressed after the rear case 410 is combined with the internal case 450 is machined. Further, an exposed surface of the internal case 450 combined by die casting is machined.

The die-casting connection portion machining process S740 is a process of machining a connection portion connected after the rear case 410 is combined with the internal case 450. For example, the die-casting connection portion corresponding to an additional region of the internal case 450 for bonding the rear case 410 and the internal case 450 may be removed.

In the injection molding process S750, the antenna region 421 or the lower end of the first rear surface portion 420 is machined and a nonmetal region is formed in the antenna region 421 or the lower end by a method such as injection molding.

Figure 13:
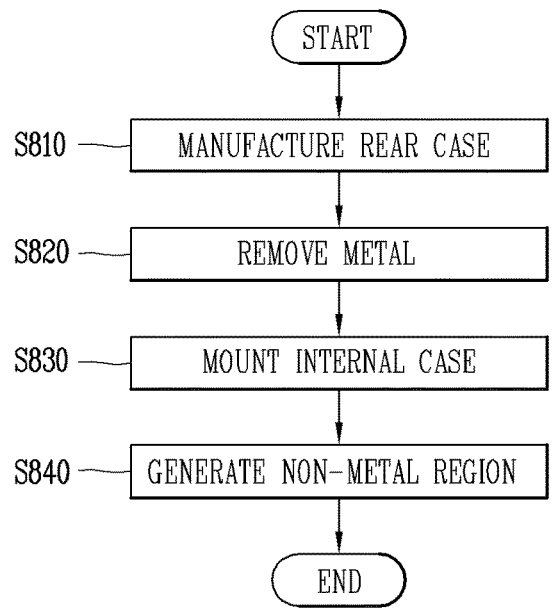
FIG. 13 illustrates a method of manufacturing a case of a mobile terminal according to an embodiment of the present disclosure.
Figure 14:
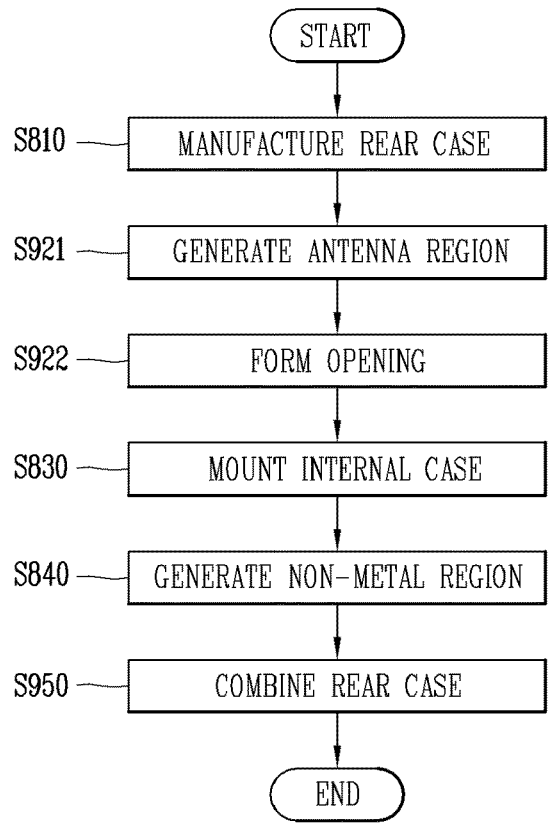
FIG. 14 illustrates a method of manufacturing a case of a mobile terminal according to another embodiment of the present disclosure.

Meanwhile, FIG. 13 illustrates a method for manufacturing a case of a mobile terminal according to an embodiment of the present disclosure. FIG. 14 illustrates a method of manufacturing a case of a mobile terminal according to another embodiment of the present disclosure.

In this regard, the matters described in FIGS. 1 to 12 may be used in combination with matters described in the method of manufacturing a case of a mobile terminal according to the present disclosure.

Referring to FIG. 13, the case manufacturing method includes a rear case manufacturing process S810, a metal removing process S820, an internal case mounting process S830, and a non-metal region generating process S840.

In the rear case manufacturing process (S810), a rear case including a rear surface portion and a side surface portion of a first metal material is manufactured. Meanwhile, in the rear case manufacturing process (S810), the side surface portion may be manufactured to include first metal members electrically separated from each other. Meanwhile, the rear surface portion and the side surface portion may be referred to as a first rear surface portion and a first side surface portion.

In the metal removing process S820, metal of the antenna region corresponding to a region in which the antenna of the rear case is accommodated is removed.

In the internal case mounting process S830, an internal case of a second metal material, which is different from the first metal material, is mounted on the rear case. Meanwhile, in the internal case mounting process S830, the rear case and the internal case are bonded by a conductive bonding liquid.

Meanwhile, the internal case may include a second rear surface portion and a second side surface portion, and the second side surface portion may be manufactured to include second metal members which are electrically separated from each other. Here, the first and second side surface portions are electrically separated from each other, and the first and second metal members may be configured to operate as antennas.

Here, in the rear case manufacturing process S810, the rear case may be manufactured by press working and the internal case may be manufactured by die casting.

Referring to the first and second metal materials, the first metal material may be at least one of aluminum (Al), steel use stainless (SUS), and titanium (Ti), and the second metal material may be magnesium (Mg).

In the non-metal region generating process S840, a non-metal region is generated by injection-molding the antenna region of the rear case, as a non-metallic member. Meanwhile, the non-metal region generating process S840 may further include a metal may be removed from the lower end of the rear case and may be injection-molded as a non-metallic member.

Meanwhile, referring to FIG. 14, the case manufacturing method includes a rear case manufacturing process S810, a metal removing process S920, an internal case mounting process S830, a non-metal region generating process S840, and a rear case coupling process S950.

Meanwhile, descriptions of the rear case manufacturing process S810, the internal case mounting process S830, and the non-metal region generating process S840 will be replaced with the descriptions of the corresponding processes in FIG. 12.

The metal removing process S920 includes an antenna region generating process S921 for removing metal from the antenna region corresponding to a region where the antenna is received in the rear surface portion and an opening forming process S922 for forming an opening for exposing an electronic component installed in the rear surface portion.

The rear case coupling process S950 is a process of detachably coupling the rear case to the rear case.

According to at least one of the embodiments of the mobile terminal according to the present disclosure including the metal rear case and the antenna, the side surfaces of the rear case and the internal case may be used as various types of antennas.

Also, according to at least one of the embodiments of the present disclosure, it is possible to solve the problem that it is difficult for the rear case, which is formed of a metal material, to be manufactured integrally with a non-metallic material to maintain electrical performance of the antenna.

In addition, according to at least one of the embodiments of the present disclosure, an increase in time and cost for manufacturing the case of the terminal having the metal case and inconvenience of manufacturing a case (or mold) may be resolved.

The manufacturing method of present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid-state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The invention claimed is:

1. A mobile terminal having a metal case forming an appearance of a terminal body, the mobile terminal comprising:
   a rear case including a first rear surface portion and a first side surface portion, the first side surface portion including first metal members which are electrically separated from each other; and
   an internal case installed inside the rear case and including a second rear surface portion and a second side surface portion, the second side surface portion including second metal members which are electrically separated from each other,
   wherein the first and second side surface portions are electrically spaced apart from each other and the first and second metal members are configured to operate as antennas.

2. The mobile terminal of claim 1, wherein
   a circuit board on which an electronic component is mounted is installed in the internal case, and
   the circuit board includes a feeding line and a ground.

3. The mobile terminal of claim 2, wherein
   the second metal member is connected to both the feeding line and the ground, and the first metal member and the second metal member are electrically connected by a connection portion to operate as radiators.

4. The mobile terminal of claim 2, wherein
   the second metal member is connected to both the feeding line and the ground, and
   the first metal member and the second metal member are configured to operate as radiators by coupling in a state in which the first metal member and the second metal member are electrically spaced apart from each other.

5. The mobile terminal of claim 2, wherein
   the first metal member is connected to any one of the feeding line and the ground,
   the second metal member is connected to the other of the feeding line and the ground, and
   the first metal member and the second metal member are electrically connected by a connection portion to operate as radiators.

6. The mobile terminal of claim 2, wherein
   the first metal member is connected to both the feeding line and the ground to operate as a radiator.

7. The mobile terminal of claim 2, wherein
   the second metal member is connected to the feeding line and the ground at a first point and a second point, and
   the first metal member and the second metal member are electrically connected by a connection portion at a third point, a middle point between the first and second points, to operate as radiators.

8. The mobile terminal of claim 3, wherein
   one end of the second metal member is electrically connected to the ground, and the other end of the second metal member is electrically connected to one end of the first metal member through the connection portion.

9. The mobile terminal of claim 5, wherein
   one ends of the first and second metal members are electrically connected to any one and the other of the feeding line and the ground, and
   the other ends of the first and second metal members are electrically connected to each other through the connection portion.

10. The mobile terminal of claim 6, wherein
    one end of the first metal member is electrically connected to the ground,
    the first metal member is connected to the feeding line at a first point spaced apart from the one end, and
    the other end of the first metal member is opened and electrically separated from another metal member constituting the first side surface portion.

11. The mobile terminal of claim 1, wherein
    the rear case is formed of a first metal material, and
    the internal case is formed of a second metal material different from the first metal material.

12. The mobile terminal of claim 1, wherein
    the rear case is manufactured by press working, and
    the internal case is manufactured by die casting.

13. The mobile terminal of claim 12, wherein
    the internal case includes:
    a first internal case manufactured by die casting; and
    a second internal case manufactured by insert molding and installed inside the first internal case.

14. The mobile terminal of claim 13, wherein
    the second internal case is manufactured by insert molding using a non-metal material, and
    the second metal member configures a first side surface portion of the first internal case manufactured by die casting.

15. A mobile terminal having a case forming an appearance of a terminal body, wherein the case comprises:
    a rear case including a rear surface portion and a side surface portion formed of a first metal material,
    wherein the rear surface portion includes an antenna region formed by removing a metal and accommodating an antenna; and
    an internal case formed of a second metal material different from the first metal material and installed inside the rear case,
    wherein the antenna region is injection-molded as a non-metal member.

16. The mobile terminal of claim 15, wherein
    the rear case is manufactured by pressing, and
    the internal case is manufactured by die casting.

17. The mobile terminal of claim 15, wherein
    the rear case further includes an opening exposing an installed electronic component to the outside.

18. The mobile terminal of claim 15, wherein
    a lower end of the rear case is injection-molded as a non-metal member and the non-metal member is a metal-removed member.

* * * * *